S. ROSENZWEIG.
VALVE GEAR.
APPLICATION FILED MAR. 17, 1911.
1,047,300.
Patented Dec. 17, 1912.
2 SHEETS—SHEET 1.
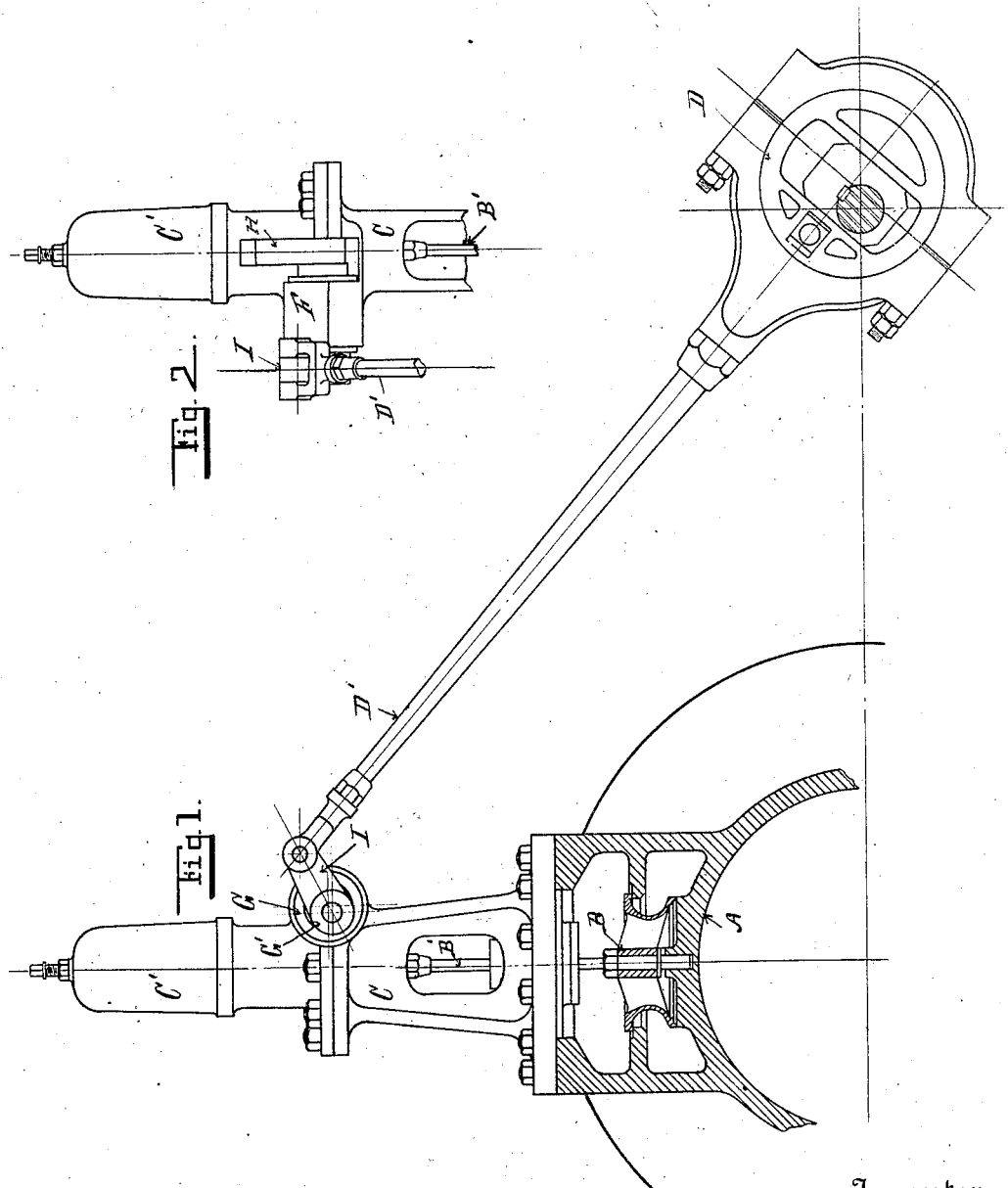
Witnesses
Florence Stockert.
G. J. Mead
Inventor
Siegfried Rosenzweig
By J. C. & H. M. Sturgeon
Attorney

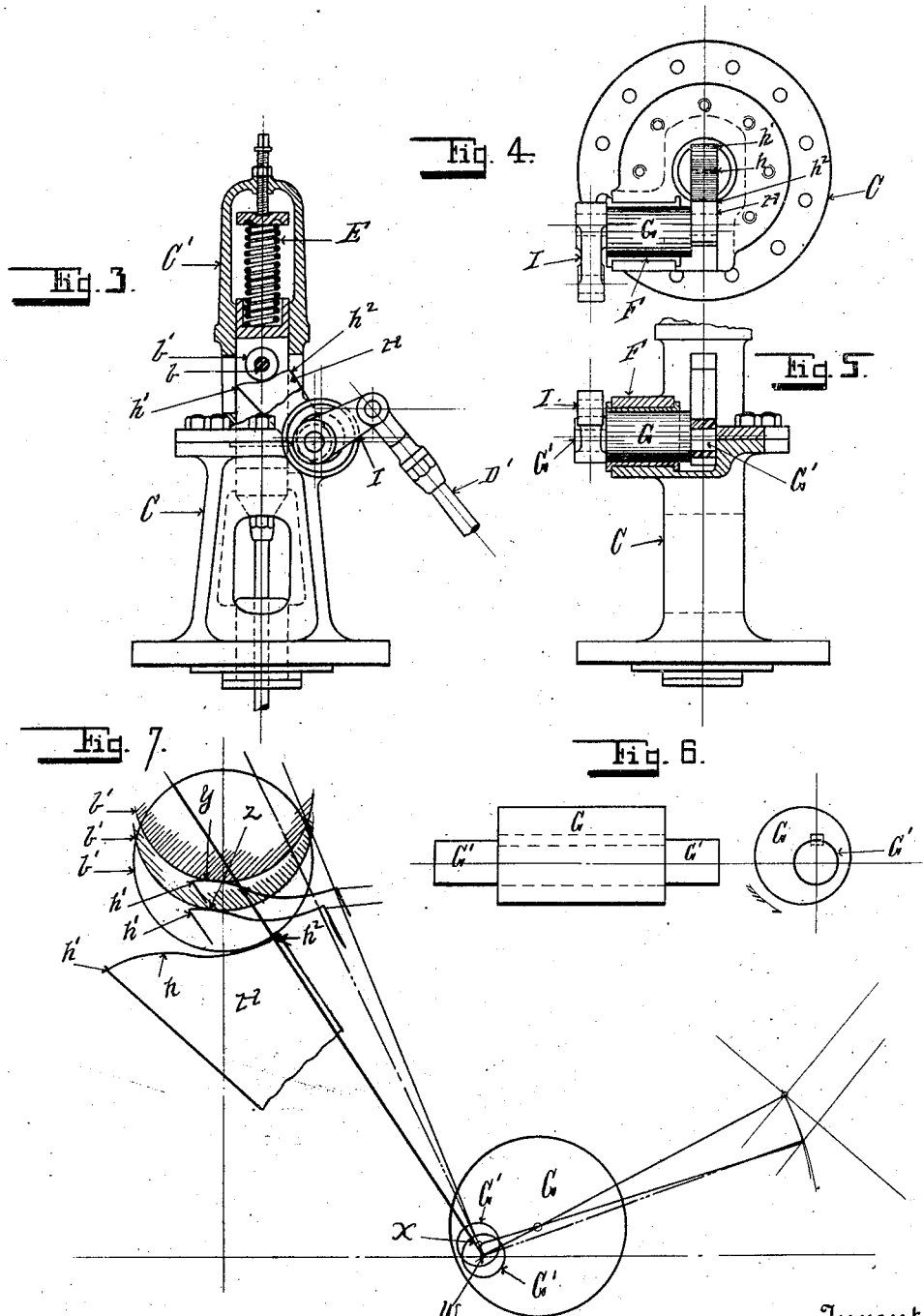

UNITED STATES PATENT OFFICE.

SIEGFRIED ROSENZWEIG, OF ERIE, PENNSYLVANIA.

VALVE-GEAR.

1,047,300.

Specification of Letters Patent.  Patented Dec. 17, 1912.

Application filed March 17, 1911. Serial No. 615,072.

*To all whom it may concern:*

Be it known that I, SIEGFRIED ROSENZWEIG, a citizen of Germany, residing at Erie, in the county of Erie and State of Pennsylvania, have invented certain new and useful Improvements in Valve-Gear; and I do hereby declare the following to be a full, clear, and exact description of the invention, such as will enable others skilled in the art to which it appertains to make and use the same, reference being had to the accompanying drawings, and to the letters of reference marked thereon, forming part of this specification.

My invention relates to valve-gear for steam engines and consists substantially in novel improvements in the construction of valve-gear wherein the valve is moved by means of an oscillating cam-lever mechanism.

In the mechanism as ordinarily constructed the cam-lever is on a shaft having a fixed axis of oscillation, and as the face of the cam-lever has a comparatively short traverse against the stud on the valve-stem the curves of the cam surface on the cam-lever must be so abrupt, in order to produce the necessary quick movement of the valve, that great difficulty is encountered in making the curves of the cam surface of a shape which will operate on the valve-stem stud without jar and noise when the mechanism is operating at high speed. To overcome this difficulty I mount the cam-lever on a shaft provided with eccentric journals rigidly secured thereto, and as the cam-lever is oscillated the axis of the shaft moves as the face of the cam-lever traverses the stud on the valve-stem, whereby I am enabled to make the curves of the cam surface on the cam-lever so much less abrupt that the cam-lever will operate against the stud on the valve-stem with comparatively little friction, and without noise or jar, and with great efficiency at whatever speed the mechanism may be operated.

The features of my invention are hereinafter fully set forth and explained, and illustrated in the accompanying drawings in which:

Figure 1, shows an end view in elevation of a puppet-valve gear embodying my invention. Fig. 2, shows a side view in elevation of a portion thereof embodying my invention. Fig. 3, shows the portion thereof embodying my invention partly in elevation and partly in section. Fig. 4, shows a top or plan view of a portion thereof embodying my invention. Fig. 5, shows an elevation thereof partly in section. Fig. 6, shows side and end elevations of the cam-lever shaft and the eccentric journal thereof. Fig. 7, shows, diagrammatically, the operation of my improvement.

In these drawings illustrating my invention, A, indicates a steam engine cylinder, B, a puppet-valve, B', the valve-stem, C, C', the valve-stem support and housing, D, a valve actuating eccentric geared to the engine-shaft (not shown) and D', an eccentric rod, all of ordinary construction. On the valve-stem, B', there is a stud $b$, preferably provided with a friction roller, $b'$, and above the valve-stem, B', within the part, C', of the housing, there is a spiral spring, E, operating on the valve-stem, B', to close the valve, B. On one side of the top of the part, C, of the valve-stem support and housing, there is provided a bearing, F, in which I mount an eccentric, G, rigidly secured to the shaft, G' so as to be rocked by said shaft, and on one end of the shaft, G', I secure a cam-lever, H, provided with a curved surface, $h$, which is preferably in the form of a reverse curve from the highest point or toe, $h'$, thereof to the lowest point, $h^2$, thereof, upon which cam-surface the roller, $b'$, on the stud, $b$, on the valve-stem, B', travels as the cam-lever, H, is oscillated, and on the opposite end of the shaft, G', I secure a lever, I, to which the eccentric rod, D', is pivoted so that it operates to oscillate the shaft, G', and the cam-lever H, secured thereto.

The operation of my improvement is illustrated in Fig. 7, wherein it is diagrammatically shown that when the forward movement of the cam lever, H, starts, the axis of the shaft, G', is at the point, $w$, while the point, $h^2$, of the cam lever, H, is in contact with the roller, $b'$, and as the shaft, G', rotates upon its eccentric journals, G, the cam surface, $h$, travels under the roller, $b'$, and gradually raises the entire cam-lever, H, until when the toe, $h'$, of the cam surface, $h$, contacts with the roller, $b'$; and meanwhile the center of the shaft G', has traveled upward to the point, $x$, carrying the cam-lever, H, upward and laterally until the toe, $h'$, thereof is raised to the point, $y$, instead of the point, $z$, as would be the case if the axis of the shaft, G', was constantly maintained at the point, $w$. The result of this eccentric movement of the shaft, G′, being that much less curvature of the cam surface, h, of the cam-lever, H, is necessary between the toe, h′, and the point, h², thereof, than is required when the axis of the shaft, G′, is stationary, to cause the cam-lever, H, to raise the roller, b′, from its lowest point in contact with the part, h², of the cam surface, to the highest point, y, of its traverse. The result of this construction being that while a maximum vertical movement is given the roller, b′, there is a comparatively small and easy curvature in the cam surface, h, of the cam-lever, H, whereby its operation on the roller, b′, is rendered comparatively noiseless and without jar at whatever speed the mechanism may be operated.

I have thus shown and described one type of construction of my improvement. It is obvious, however, that the invention can be utilized in various constructions of puppet-valve mechanism without departing from the spirit of my invention.

Therefore what I claim as new and desire to secure by Letters Patent is:

1. The combination in an engine valve-gear, of a valve-stem, a rock-shaft rigidly mounted on an eccentric rotatable in a bearing adjacent to said valve-stem, a cam-lever rigidly secured to said rock-shaft so as to engage said valve-stem, and means for operating said rock-shaft, substantially as set forth.

2. The combination in an engine valve-gear, of a valve-stem, a stud on said valve-stem, a rock-shaft rigidly mounted on an eccentric rotatable in a bearing adjacent to said valve-stem, a cam-lever rigidly secured to said rock-shaft so as to engage said stud, and means for operating said rock-shaft, substantially as set forth.

3. The combination in an engine valve-gear of a valve-stem, a rock-shaft rigidly mounted on an eccentric rotatable in a bearing adjacent to said valve-stem, a cam-lever rigidly secured to said rock-shaft so as to engage said valve-stem, an operating lever rigidly secured on said rock-shaft and spring mechanism adapted to maintain said valve-stem in a normally downward position, substantially as and for the purpose set forth.

In testimony whereof I affix my signature, in presence of two witnesses.

SIEGFRIED ROSENZWEIG.

Witnesses:
G. J. MEAD,
FLORENCE STOCKERT.